Figure 1:
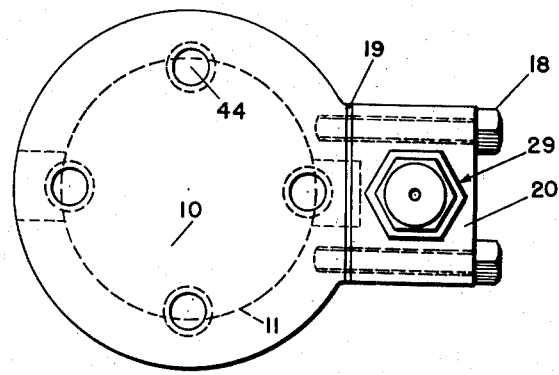

Sept. 9, 1952  W. S. BOHLMAN  2,609,791
PNEUMATIC VIBRATOR
Filed Dec. 22, 1949  3 Sheets-Sheet 1

INVENTOR.
WALTER S. BOHLMAN
BY
Ernest G. Peterson
AGENT

Sept. 9, 1952 W. S. BOHLMAN 2,609,791
PNEUMATIC VIBRATOR

Filed Dec. 22, 1949 3 Sheets-Sheet 2

WALTER S. BOHLMAN
*INVENTOR.*

BY Ernest G. Peterson

AGENT

Sept. 9, 1952 W. S. BOHLMAN 2,609,791
PNEUMATIC VIBRATOR
Filed Dec. 22, 1949 3 Sheets-Sheet 3

WALTER S. BOHLMAN
INVENTOR.

BY Ernest J. Peterson
AGENT

Patented Sept. 9, 1952

2,609,791

UNITED STATES PATENT OFFICE 2,609,791

PNEUMATIC VIBRATOR

Walter S. Bohlman, Wilmington, Del., assignor to Hercules Powder Company, Wilmington, Del., a corporation of Delaware Application December 22, 1949, Serial No. 134,528

12 Claims. (Cl. 121—26)

This invention relates to vibrators and more particularly to pneumatic vibrators having a unidirectional power stroke and a controllable speed of vibration at a given power.

Electric and fluid pressure-actuated vibrators have an ever-increasing scope of application. Where a vibration of very high frequency is desired, an electric vibrator is generally employed while a hydraulic or pneumatic vibrator is normally used where a vibration of somewhat lower frequency is desired, or where the use of electricity is undesirable. In fact, one of the principal advantages of a hydraulic or pneumatic vibrator over an electric vibrator lies in the fact that although it is necessary to vary power, a fluid-actuated vibrator can be made to operate at different speeds by a simple valving mechanism situated in the feed line in contrast to thermionic valving or other complicated electrical means necessary to controlling the frequency of electric vibrators. An additional advantage is that hydraulic or pneumatic vibrators are substantially explosionproof and lend themselves to applications where explosive atmospheres are encountered or explosive materials are actually being conveyed or packed by vibration.

Present hydraulic or pneumatic vibrators have the disadvantage, however, that in order to alter their vibration frequency, the pressure of the actuating medium must be correspondingly altered. Such alteration is normally effected by closing or opening an ordinary globe valve in the supply line. Consequently, as the pressure of the actuating medium is varied to alter speed and/or amplitude of vibration, the power delivered by each stroke of the pulsating piston is correspondingly altered. This is extremely disadvantageous where it is desired to employ a power stroke of constant force but at differing frequencies. As a result, it has been found necessary to design a vibrator for each particular application. For example, it has been found that in using vibration for packing, different speeds of vibration are required for optimum results and power economy with different materials. It has been discovered that light, fluffy substances, such as aluminum leafing powder and soap flakes, cannot be settled in a container with a high-speed vibration, but will settle when a frequency of about one hundred oscillations per minute is employed. In comparison, heavier materials, such as coffee, pack best at much higher frequencies. It will at once be seen, therefore, that even if a manufacturer produces only a single commodity, but makes it in particles of substantially different size and density, a different vibrator for each substantially different particle size and type must be employed to obtain optimum performance in terms of packing time, packing density, and power economy. Since a large number of vibrators are economically undesirable, it has been the practice to select a vibrator having a frequency and power stroke giving fairly satisfactory packing for an average material.

While the pressure of the actuating medium of a fluid-actuated vibrator can be diminished to reduce frequency, the reduced speed of vibration can only be obtained at a sacrifice in the power of the individual power stroke. The desirability of a vibrator which operates at a constant pressure with a constant power stroke, but which may also be operated at any desired frequency up to the natural frequency of the particular vibrator, is consequently apparent.

Therefore, an object of the present invention is a pneumatic vibrator having a unidirectonal power stroke which may be made to operate at variable speeds without altering the pressure of the actuating medium.

A further object of the invention is a pneumatic vibrator having a unidirectional power stroke, which may be operated at variable speeds without changing the force exerted by the individual power stroke.

An additional object of the invention is an adjustable, automatic valve assembly for a pneumatic vibrator with a unidirectional power stroke which will operate to interrupt the flow of compressed air during the exhaust stroke of the vibrator piston and by which the vibration frequency may be controlled, if desired.

Generally described, the present invention is a pneumatic vibrator having in combination a casing forming a cylinder, a reciprocable piston disposed in the cylinder, exhaust ports located in the casing adjacent the opposite ends of the cylinder, an air inlet for pressurized air leading to one end of the cylinder, an air exit passage for air compressed by the piston leading from the opposite end of the cylinder, and a valve assembly; said valve assembly having in combination a first passageway therethrough which is in communication at one end with the air inlet in the vibrator casing and at the other end with a source of pressurized air; a second passageway therethrough, one end of which is in communication with the air exit passage in the vibrator casing and the other end of which leads to the atmosphere; said second passageway having a check valve at the end thereof which registers with the air exit passage and a metering means for air at the end thereof leading to the atmosphere; and slidable means disposed within the valve assembly which is movable in one direction to close the first passageway under the force exerted by the compressed air admitted to the second passageway through the check valve and which is movable in the opposite direction to open the first passageway under the force exerted by the pressurized air when sufficient of the compressed air is released to the atmosphere through the metering means. An additional embodiment of the invention is a valve assembly for a pneumatic vibrator having a unidirectional power stroke whereby vibration frequency can be positively controlled which has in combination a casing, a first passageway through the casing having an inlet for pressurized air at one end thereof and an outlet for pressurized air at the other end thereof, a second passageway through the casing having an inlet for air at one end and an outlet for air at the other, said second passageway having a check valve positioned in the inlet to permit entry of air under pressure but to prevent a reverse flow and a metering means for air disposed in the outlet whereby the flow of air through the outlet is regulated, and slidable means disposed within the valve assembly which is moveable in one direction to close the first passageway when the force exerted by the air in the second passageway on the slidable means exceeds the force exerted on the slidable means by the air in the first passageway and which is moveable in the opposite direction when sufficient of the pressure in the second passageway has been released through the metering means.

Figure 3:
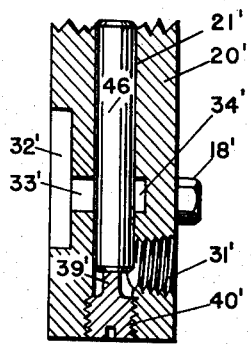
Figure 2:
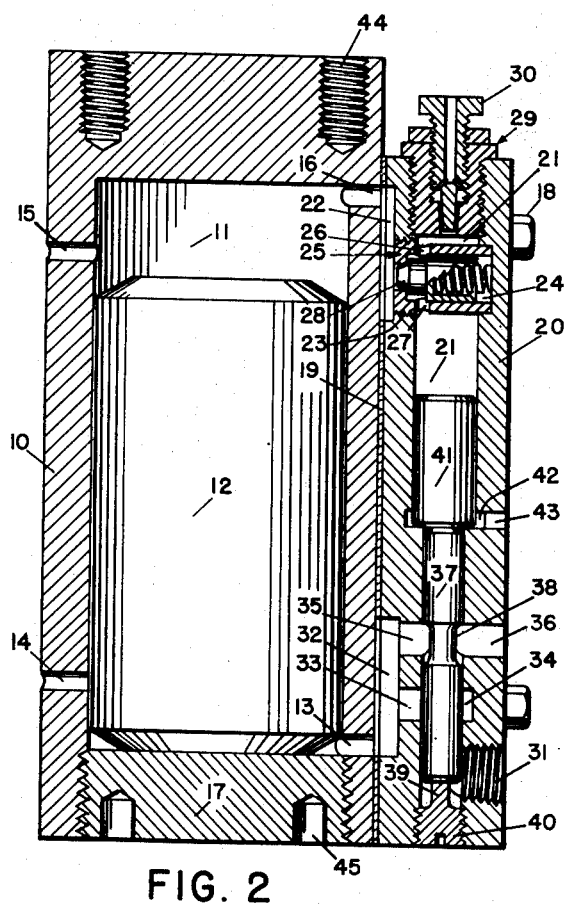
Figure 4:
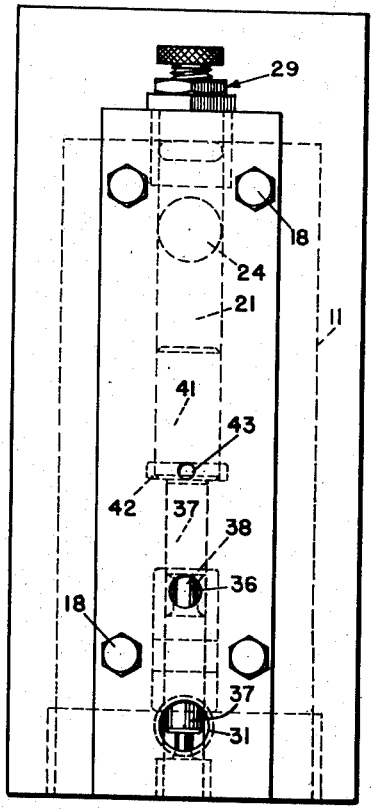

Having generally described the invention, more specific illustration of various embodiments will be given with reference to the accompanying drawings wherein reference symbols refer to like parts wherever they occur. Fig. 1 is a plan view of a vibrator in accordance with a preferred embodiment of the invention. Fig. 2 is a part sectional, part elevational view of the vibrator of Fig. 1. Fig. 3 is an alternate embodiment of a portion of the valve assembly shown in Fig. 2, and Fig. 4 is a side elevation of the vibrator shown in Fig. 2. Figs. 5, 6, 7 and 8 are part elevational, part sectional views of the vibrator of Fig. 2 at different points in the operational cycle. Fig. 9 is a part sectional, part elevational view of a vibrator according to a further embodiment of the invention.

Referring to Figs. 1, 2, 4, 5, 6, 7 and 8, and particularly to Fig. 2, a pneumatic vibrator is shown having a casing 10 forming a cylinder 11. A reciprocable piston 12 is positioned in cylinder 11. An air inlet 13 to the cylinder 11 is located in one end of the casing 10 and exhaust ports 14 and 15 are positioned in the casing 10 at points equidistant from the ends of the cylinder 11. The exhaust ports 14 and 15 are separated by a distance equal to the length of the piston 12 so that when one end of the piston begins to cover one port, the other end of the piston will begin to uncover the other port. An additional air exit passage 16 from the cylinder 11 is situated in the casing 10 at the end opposite the air inlet port 13. A threaded plug 17 seals the bottom of the vibrator casing 10 which enables insertion and withdrawal of the piston 12.

Affixed to the side of hte vibrator casing 10 by bolts 18 and sealing gasket 19 is a valve assembly having a casing 20 which forms a chamber 21 having two sections of different diameter. A recess 22 is located in the valve casing 20 and is in communication with the air exit passage 16 in the vibrator casing 10. A thread 23 is formed in valve casing 20 and extends into the chamber 21. A recess 24 is formed in the wall of casing 20 opposite the thread 23. A threaded spring-actuated check plug 25 threadedly engages the thread 23, with the base of the plug being retained in the recess 24. Check plug 25 has ports 26 and 27 located respectively in the upper and lower walls thereof. A valve 28 in check plug 25 allows the passage of compressed air through ports 26 and 27 into the chamber 21 from the recess 22 but prohibits a reverse flow. Above the check plug 25 the casing 20 is threaded to receive a threaded, adjustable exhaust valve 29. The valve 29 is adjusted by screw 30 and whenever the valve 29 is partially or fully open, chamber 21 is in communication with the atmosphere through the ports 26 and 27 in the check plug 25 and through the valve 29.

An air inlet 31 is located in the valve casing 20 near the closed end of the portion of chamber 21 having the smaller diameter. A recess 32, formed in the valve casing 20, is in communication with inlet 13 in the vibrator casing 10. In communication with recess 32 is a passage 33 which opens into the chamber 21 above the air inlet 31. Recess 34 in the casing 20 is a continuation of passage 33. Also in communication with the recess 32 is a passage 35 which opens into the chamber 21 at a point above passage 33. Passage 36 is a continuation of passage 35 through casing 20 to the atmosphere.

A reciprocable piston 37 is disposed in slidable, substantially air-tight relationship in the portion of the valve chamber 21 having the smaller diameter. An annular groove 38 is cut in the piston 37 so that the groove registers with passages 35 and 36 when the piston is fully within the portion of the chamber having the smaller diameter. The distance to which the piston may extend into this portion of the chamber when inserted from the portion having the larger diameter is governed by a projection 39 on a threaded plug 40 disposed in the valve casing 20 at the base of the chamber 21.

A piston 41 is disposed in slidable, substantially air-tight relationship below check plug 25 in the portion of the chamber 21 having the greater diameter. The length of the piston 41 is such that when it is forced upward by the piston 37, the lower end of the piston 37 is able to clear the upper edge of passage 33 and recess 34, thus bringing air inlet 31 and passage 33 into communication. An annulus 42 is formed in the wall of chamber 21 at the point where the piston 41 meets the piston 37 when the piston 37 is resting on the projection 39 of the plug 40. An orifice 43 is provided in the valve casing 20 which leads from the annulus 42 to the atmosphere, thus allowing air to enter the large portion of the chamber 21 under the piston 41 when the piston 41 is forced upward by the piston 37. When the piston 41 returns to the position shown in Fig. 2, the air admitted on the up-stroke exhausts to the atmosphere.

Threaded sockets 44 are provided in the top of the vibrator casing 10 to enable the vibrator to be secured to the object to be vibrated. Sockets 45 are provided in the plug 17 to receive a spanner for securing the plug 17 in place.

The operation of the preferred embodiment of the pneumatic vibrator will be described with specific reference to Figs. 5, 6, 7 and 8.

Figure 5:
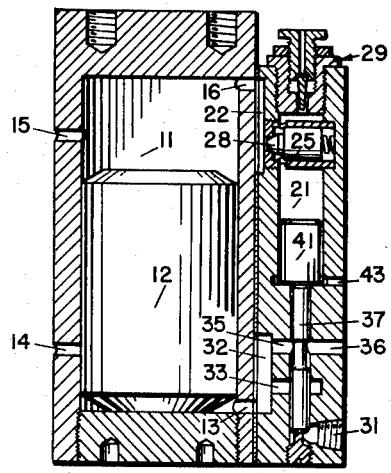

In Fig. 5 the vibrator is shown idle prior to the admission of compressed air from the power line. Piston 12 in the vibrator and piston 41 and piston 37 of the valve assembly are all in the down position and the valve 28 of check plug 25 is closed.

Figure 6:
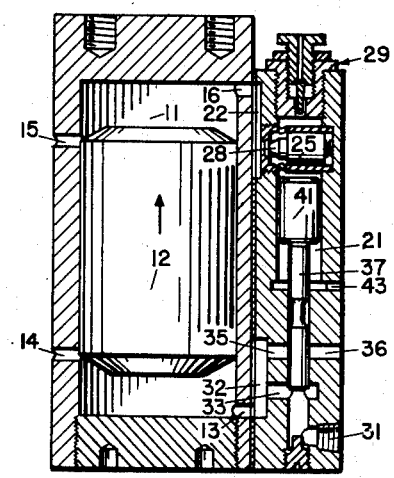

In Fig. 6 the air has been turned on and has been admitted to the bottom of chamber 21 through the air inlet 31. Piston 37 and piston 41 have been forced up and the pressurized air is flowing into the vibrator cylinder through the lower portion of chamber 21, passage 33, recess 32, and air inlet 13. The piston 12 is being forced upward, exhaust port 14 is just being opened, and exhaust port 15 is just being closed. Up to this point air has been escaping through the exhaust port 15, but at the position shown the air above the piston 12 is being compressed, valve 28 of check plug 25 is beginning to open, and air is beginning to flow into chamber 21 above the piston 41. The piston 12 is probably at its highest velocity at this point, and for a fleeting instant there is at least theoretically a free passage for air from the power line to the atmosphere through exhaust port 14. However, the pressure below the piston 12 is still greatly above atmospheric and is exerting pressure on the piston.

Figure 7:
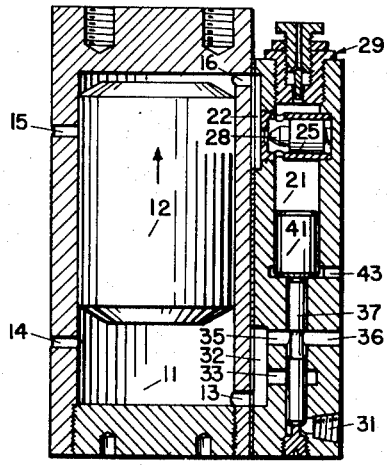

In Fig. 7 the piston 12 is at substantially the end of its upward stroke. The air above the piston 12 has been compressed and forced through the valve 28 of the check plug 25 into chamber 21. Depending upon the setting of the valve 29, some of this air has escaped to the atmosphere, but because of the difference in area of the piston 41 and the face of the piston 37, the pressure is sufficient to overcome the air line pressure and the piston 41 and piston 37 have been forced downward to cut off the flow of air to the vibrator cylinder 11.

Figure 8:
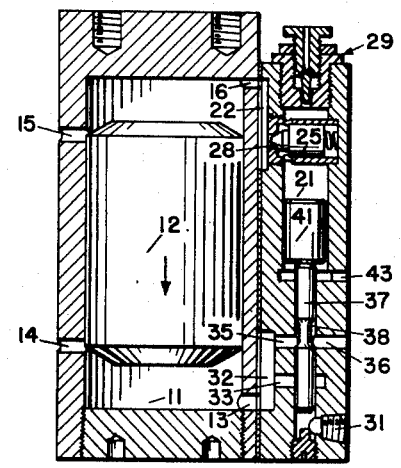
Figure 9:
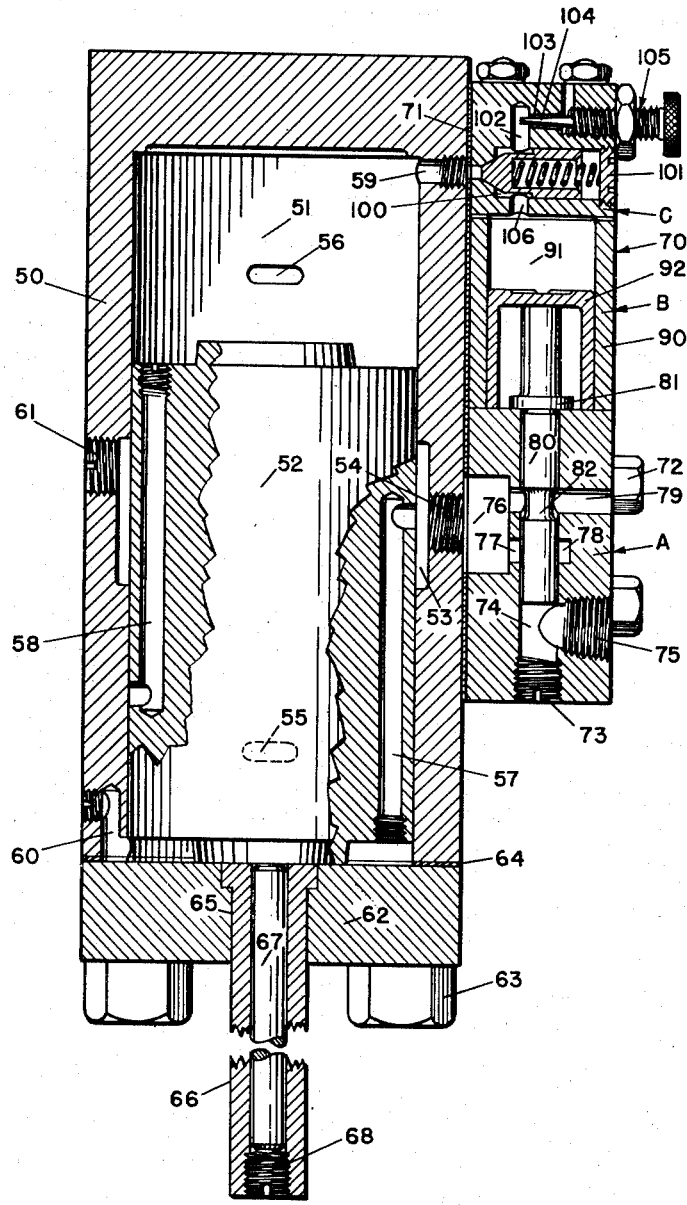

In Fig. 8 the piston 12 is traveling downward under the force of gravity and the expansion of the air cushion formed between the top of the piston 12 and the cylinder head. The valve 28 in check plug 25 has now closed and the compressed air is trapped above the piston 41, except for that escaping through the exhaust valve 29. At the same time the air below the falling vibrator piston 12 has been escaping through the exhaust port 14 and through the air inlet port 13, recess 32, passage 35, annular groove 38, and passage 36. Once exhaust port 14 is covered, all remaining air escapes by the latter course. When exhaust port 15 is opened, as shown, the downward travel of piston 12 is accelerated only by the acceleration of gravity. Meanwhile, the air trapped above piston 41 is gradually escaping through exhaust valve 29. When there has been a sufficient pressure diminution in chamber 21 above piston 41, the air line pressure forces the piston 37 and the piston 41 to rise as in Fig. 6, and the cycle is repeated. As the valve 29 is adjusted toward the open or closed position, the time taken for the line pressure to overcome the pressure above the piston 41 is correspondingly diminished or increased and the frequency of vibration thereby positively controlled. The valve 29 may also be used as a shut-off valve during operations since the piston 37 will be held suppressed, if no air is allowed to escape through valve 29, until sufficient air leaks by piston 41 and escapes through orifice 43 or if orifice 43 and annulus 42 are omitted until sufficient air leaks by piston 37 and escapes to the atmosphere through passage 36. However, if piston 41 and piston 37 are properly machined, they can be made substantially air tight.

Referring particularly to Fig. 3, an alternate embodiment of a portion of the valve assembly is shown which may be employed in the vibrators in accordance with the invention. A casing 20' forms a chamber 21'. Disposed within the chamber 21' in slidable, substantially air-tight relationship is a piston 46. The distance which the piston 46 may enter the chamber 21' is limited by the projection 39' of a threaded plug 40' secured in the threaded end of the chamber 21'. A recess 32' is formed in the casing 20' and leading from the recess 32' to the chamber 21' is a passage 33'. A recess 34' is a continuation of passage 33' across the chamber 21' and into the opposite wall thereof. It will at once be noted that the only difference between the portion of the valve assembly shown in Fig. 3 and the corresponding portion of the valve mechanism as shown in Fig. 2 is the omission of the auxiliary exhaust passages 35 and 36 and the annular groove 38 in the piston 37. In operation, the omission of the additional exhaust channel only results in a slightly shorter stroke of piston 12.

Referring in particular to Fig. 9, another embodiment of the pneumatic vibrator of the invention is shown in which the direction of the power stroke may be reversed. A casing 50 forms a cylinder 51 in which is disposed a reciprocable piston 52. An annular groove 53 is cut in the wall of cylinder 51 midway between the ends thereof. An air inlet port 54 extends through the casing 50 from the annular groove 53. Exhaust ports 55 and 56 are disposed in the cylinder wall at points equidistant from the ends. The distance between the ports is such that during reciprocation one end of the piston 52 begins to cover one exhaust port just as the opposite end of the piston 52 begins to uncover the other exhaust port. The piston 52 has ducts 57 and 58 extending from either end thereof to a point which will communicate with annular groove 53 when the piston is at the end of its stroke in either direction and for some distance during the power or exhaust stroke. Air exit passages 59 and 60 are provided at either end of the cylinder 51 for registry with the inlet port in the large portion of the valve cylinder in a manner similar to that described in connection with Fig. 2. Depending on the desired direction of the power stroke, one of passages 59 and 60 is plugged as is one of the ducts 57 and 58 in the piston 52. A plugged alternate air inlet port 61 is also provided for use when the power stroke is reversed as will be hereinafter described. The bottom end of the casing 50 is formed by a head 62 maintained in sealing relationship by bolts 63 and gasket 64. Concentrically disposed in the cylinder head 62 is a stepped orifice 65. Disposed in the orifice 65 is a member 66 having a cylindrical bore containing a piston 67. The extremity of member 66 is threaded to receive a sealing plug 68.

A valve assembly 70 is affixed to the side of the vibrator casing 50 with a sealing gasket 71 and bolts 72 and is composed of three sections A, B, and C. Section A contains a longitudinally disposed bore which is closed at one end by a plug 73 to form a cylinder 74. An air inlet 75 is located in the wall of section A near the end of cylinder 74. A recess 76 is located in the wall of section A at a point above the air inlet 75 and is in communication with the air inlet port 54 in the vibrator casing. A passage 77 leads from recess 76 to the cylinder 74 and is extended across the bore and into the opposite cylinder wall to form a recess 78. Above the passage 77 is located a second passage 79 which leads from recess 76 to the cylinder and is extended across the bore, through the casing and to the atmosphere. The lower portion of a piston 80 is disposed in slidable, substantially air-tight relationship in cylinder 74 and is prevented from closing air inlet 75 by an annular enlargement 81 which engages the end of section A. An annular groove 82 is cut in the piston 80 at a point which registers with passage 79 when the piston 80 extends into the cylinder 74 to the length permitted by the enlargement 81.

Section B of the valve assembly is a sleeve 90 which forms a cylinder 91 having a substantially greater diameter than cylinder 74 in section A. Mounted in cylinder 91 is a hollow, open-ended piston 92, the walls of which are in slidable, substantially air-tight relationship with the walls of cylinder 91. The upward travel of the piston 92 is restricted by the superimposed section C.

Section C of the valve assembly contains a chamber 100 which is in communication with the air exit passage 59 in the vibrator casing 50 and contains a spring-actuated check plug 101 which admits pressurized air from passage 59 into chamber 100, but prohibits a reverse flow. A passage 102 extends from chamber 100 to meet a passage 103 which vents to the atmosphere. Disposed in the passage 103 is the needle 104 of needle valve assembly 105 which is capable of completely shutting off passage 103 or leaving it open to the desired degree. Chamber 100 of section C is in communication with cylinder 91 of section B through port 106. Check plug 101 is inserted into chamber 100 and retained therein by a threaded plug 107 in the wall of the valve casing 90.

The operation of the vibrator of Fig. 9 is substantially identical to that described in the preferred embodiment. To begin operation, the needle valve 105 may be left open or may be adjusted to a predetermined setting. The incoming air passes through inlet 75 into the end of cylinder 74 and forces pistons 80 and 92 up until passage 77 is brought into communication with the air inlet 75. The air then passes through passage 77, through recess 76 and inlet port 54 into annulus groove 53 and down duct 57 to the base of piston 52. The piston 52 is forced upward and when it passes exhaust port 56, the remaining air is compressed in the upper portion of cylinder 51. The check plug 101 is forced backward into chamber 100 and the compressed air admitted into chamber 100 passes through port 106 into cylinder 91 where it exerts pressure on piston 92. Piston 92 is depressed and piston 80 is thus forced downward to interrupt the flow of incoming air. The piston 80 is forced upward by the pressure of the incoming air when sufficient of the pressure above the piston 92 has been bled off to the atmosphere through the exhaust valve 105. Consequently, the vibration frequency of the vibrator shown in Fig. 9 may be readily controlled without any change in the effective force of the individual power stroke of the piston. An additional feature of this particular vibrator is that it will run at its natural frequency when the exhaust valve 105 is opened completely since the piston 80 will then never be depressed and the air to the base of piston 52 is cut off when the duct 57 is out of communication with annulus 53.

In case it is desirable to reverse the direction of the power stroke of the vibrator shown in Fig. 9, a plug is placed in duct 57 and the plug is removed from duct 58. Alternatively, the plugs may be left as shown and the piston may be removed and inverted. The entire valve assembly 70 is then removed and the passage 59 and the air inlet port 54 are suitably plugged. The plugs are removed from the alternate air exit passage 60 and from the alternate air inlet port 61. The valve assembly is then inverted and secured to the opposite side of the vibrator casing 50 so that chamber 100 is in communication with the alternate air exit passage 60, and passage 77 is in communication with alternate air inlet port 61. The plug 68 is removed from the end of member 66 and the member is connected to an air line, not shown. Preferably the air line should be equipped with a valve by which the amount of pressurized air admitted to the bore of member 66 may be controlled. Only sufficient pressure should be applied to piston 67 to enable it to raise piston 52 against the force of gravity.

Operation of the vibrator of Fig. 9 with a reversed power stroke is identical with the normal operation above described except for the means provided to return the piston to the top of the cylinder against the force of gravity. The piston 67 reciprocates with the vibrator piston forcing the vibrator piston up against the force of gravity and being driven downward during the vibrator's power stroke. The air actuating the piston should be regulated to the minimum required to raise the piston and in this way, the retardation of the vibrator piston during the power stroke is negligible.

It is preferred that the exhaust ports of the vibrators of the invention be spaced evenly from the ends of the vibrator cylinders and that these ports be separated by a distance substantially equal to the length of the piston. With this arrangement the best results are achieved both from the standpoint of smoothness of operation and economy of air. However, this preferential arrangement is not essential to the operation of the vibrator. As long as the port being uncovered by the piston during the power stroke is located far enough from the end of the cylinder to enable the piston to gain sufficient velocity, the momentum of the piston will insure completion of the stroke even though the port is open during the last portion of the stroke. When the piston is returned to its starting point, either by gravity or other means, the port should be located close enough to the end of the cylinder to allow most of the air to exhaust and thus give a substantially full stroke. The auxiliary exhaust means shown in the drawings is helpful in this regard.

The exhaust port being covered by the piston during the power stroke should be placed close enough to the opposite end of the cylinder to allow the piston to make a substantially full stroke but should be located far enough from the end of the cylinder that enough air is trapped and compressed in the end of the cylinder to fully depress the valve piston or other slidable means in the valve assembly. All of these factors must be coordinated to give optimum results in each particular design and size of vibrator in accordance with the invention.

It is preferred that two separate but coacting pistons be employed in the valve assembly as illustrated in the drawings. A single piston having two different diameters is operable, but is not preferred because the single piston is more difficult to lap to the substantially air-tight fit necessary to satisfactory operation of the valve assembly.

The advantages of the vibrator of the invention are many. If used in vibration packing, the vibration frequency may be easily adjusted to give the optimum number of oscillations per minute of any desired force within the structural limitations of the vibrator. If employed in feeder and conveyor applications, the unidirectional stroke and control of frequency make it possible to choose the power necessary and then readily control the direction and speed of movement. If used to prevent clogging of hoppers and bins, the flexibility of control over frequency makes it possible to obtain the desired results while employing a frequency and power which tax the structure with which the vibrator is employed as little as possible. Many other advantages and additional modifications which do not depart from the scope of the invention will become apparent to those skilled in the art. It is, therefore, intended that the invention be limited only by the scope of the appended claims.

What I claim and desire to protect by Letters Patent is:

1. A pneumatic vibrator having in combination a casing forming a cylinder, a reciprocable piston disposed in the cylinder, exhaust ports located in the casing adjacent the opposite ends of the cylinder, an air inlet for pressurized air leading to one end of the cylinder, an air exit passage for air compressed by the piston leading from the opposite end of the cylinder, and a valve assembly; said valve assembly having in combination a first passageway therethrough which is in communication at one end with the air inlet in the vibrator casing and at the other end with a source of pressurized air; a second passageway therethrough, one end of which is in communication with the air exit passage in the vibrator casing and the other end of which leads to the atmosphere, said second passageway having a check valve at the end thereof which registers with the air exit passage and a metering means for air at the end thereof leading to the atmosphere; and slidable means disposed within the valve assembly which is movable in one direction to close the first passageway under the force exerted by the compressed air admitted to the second passageway through the check valve and which is movable in the opposite direction to open the first passageway under the force exerted by the pressurized air when sufficient of the compressed air is released to the atmosphere through the metering means.

2. A pneumatic vibrator having in combination a casing forming a cylinder, a reciprocable piston disposed in the cylinder, exhaust ports located in the casing adjacent the opposite ends of the cylinder which are separated by a distance substantially equal to the length of the piston, an air inlet for pressurized air leading to one end of the cylinder, an air exit passage for air compressed by the piston leading from the opposite end of the cylinder, and a valve assembly; said valve assembly having in combination a first passageway therethrough which is in communication at one end with the air inlet in the vibrator casing and at the other end with a source of pressurized air; a second passageway therethrough, one end of which is in communication with the air exit passage in the vibrator casing and the other end of which leads to the atmosphere, said second passageway having a check valve at the end thereof which registers with the air exit passage and a metering means for air at the end thereof leading to the atmosphere; a chamber disposed in the valve assembly which has two portions of different diameter, the portion of smaller diameter intersecting the first passageway and the section of larger diameter being in communication with the second passageway at a point between the check valve and metering means; and reciprocable means disposed in the chamber having sections of different diameter which register with the walls of the chamber in substantially air-tight relationship, said means being movable in one direction to close the first passageway under the force exerted by the compressed air admitted to the second passageway through the check valve and being movable in the opposite direction to open the first passageway under the force exerted by the pressurized air when sufficient of the compressed air is released to the atmosphere through the metering means.

3. A vibrator according to claim 2 in which the reciprocable means disposed in the chamber of the valve assembly consists of two separate pistons.

4. A pneumatic vibrator having in combination a casing forming a cylinder, a reciprocable piston disposed in the cylinder, exhaust ports located in the casing adjacent the opposite ends of the cylinder which are separated by a distance substantially equal to the length of the piston, an air inlet for pressurized air leading to one end of the cylinder, an air exit passage for air compressed by the piston leading from the opposite end of the cylinder, and a valve assembly; said valve assembly having in combination a valve casing forming a valve chamber having two portions of different diameter; an air inlet port for admission of pressurized air to the end of the valve chamber having the smaller diameter, said port being in communication through the valve chamber with the vibrator inlet port; a port adjacent to the end of the portion of the valve chamber having the greater diameter, said port containing a check valve and being in communication with the vibrator air exit passage, said check valve allowing compressed air to pass from the vibrator cylinder into the valve cylinder but prohibiting a return flow; an outlet port located adjacent to the end of the portion of the valve cylinder having the greater diameter, said port containing an adjustable exhaust valve; and a reciprocable piston mounted in the valve chamber, said piston having sections of two different diameters which register with the differential diameters of the valve chamber in slidable, substantially air-tight relationship, said piston being movable in one direction to shut off the flow of pressurized air from the air inlet port of the valve assembly to the air inlet port in the vibrator casing when the force exerted by the compressed air on the large end of the piston exceeds the force exerted on the small end of the piston by the pressurized air, and movable in the opposite direction to allow said flow of pressurized air when sufficient of the pressure on the large end of the piston is relieved through the adjustable exhaust valve.

5. The vibrator of claim 2 in which a passage is provided in the valve casing which leads to the atmosphere from a point in the chamber wall adjacent to the point of juncture of the two sections of the piston at the time when the piston is at its limit of movement into the portion of the valve cylinder having the smaller diameter, said passage allowing atmospheric air to enter the valve cylinder under the large portion of the piston when the piston is moved in the opposite direction.

6. The vibrator of claim 2 in which an auxiliary exhaust means is provided for exhausting air from beneath the vibrator piston during its exhaust stroke, said means comprising a passage in communication with the air inlet port in the vibrator casing and which passes through the valve casing at a point about the air inlet port located in the portion of the valve cylinder having the smaller diameter, and which registers with an annular groove cut in the valve piston when the piston is at its limit of movement into the portion of the valve cylinder having the smaller diameter.

7. A valve assembly for a pneumatic vibrator having a unidirectional power stroke whereby vibration frequency can be positively controlled, which in combination has a casing, a first passageway through the casing having an inlet for pressurized air at one end thereof and an outlet for pressurized air at the other end thereof, a second passageway through the casing having an inlet for air at one end and an outlet for air at the other end, said second passageway having a check valve positioned in the inlet to permit entry of air under pressure but to prevent a reverse flow and a metering means for air disposed in the outlet whereby the flow of air through the outlet is regulated, and slidable means disposed within the valve assembly having the ends thereof in substantially fluid-impervious relationship with each other, the end thereof disposed adjacent the second passageway having a greater diameter than the end thereof disposed adjacent the first passageway, said slidable means being moveable in one direction to close the first passageway when the force exerted by the air in the second passageway on the slidable means exceeds the force exerted on the slidable means by the air in the first passageway and which is moveable in the opposite direction when sufficient of the pressure in the second passageway has been released through the metering means.

8. A valve assembly for a pneumatic vibrator having a unidirectional power stroke whereby vibration frequency can be positively controlled, which in combination has a casing, a first passageway through the casing having an inlet for pressurized air at one end thereof and an outlet for pressurized air at the other end thereof, a second passageway through the casing having an inlet for air at one end and an outlet for air at the other, said second passageway having a check valve positioned in the inlet to permit entry of air under pressure but to prevent a reverse flow and a metering means for air disposed in the outlet whereby the flow of air through the outlet is regulated, a chamber disposed in the valve assembly which has two portions of different diameter, the portion of smaller diameter intersecting the first passageway, and the portion of larger diameter being in communication with the second passageway at a point between the check valve and metering means, and reciprocable means disposed in the chamber having sections of different diameter which register with the walls of the chamber in substantially air-tight relationship, said means being moveable in one direction to close the first passageway when the force exerted on the end of the section having the larger diameter exceeds the force exerted on the end of the section having the smaller diameter by the air in the first passageway, and being moveable in the opposite direction by the force exerted on the end of the section having the smaller diameter to open the first passageway when sufficient of the pressure in the second passageway has been released through the metering means.

9. A valve assembly according to claim 7 in which the reciprocable means disposed in the chamber consists of two separate pistons.

10. A valve assembly according to claim 7 in which a passage is provided in the valve casing which leads to the atmosphere from a point in the chamber wall adjacent to the point of juncture of the two sections of the piston at the time when the piston is at its limit of movement into the portion of the valve cylinder having the smaller diameter, said passage allowing atmospheric air to enter the valve cylinder under the large portion of the piston when the piston is moved in the opposite direction.

11. A vibrator according to claim 1 in which a fluid-actuated piston is slidably mounted in the end of the vibrator cylinder at which the vibrator piston completes its power stroke, said fluid-actuated piston being in longitudinal alignment with the vibrator piston.

12. A vibrator according to claim 4 in which a fluid-actuated piston is slidably mounted in the end of the vibrator cylinder at which the vibrator piston completes its power stroke, said fluid-actuated piston being in longitudinal alignment with the vibrator piston.

WALTER S. BOHLMAN.

REFERENCES CITED

The following references are of record in the file of this patent:

FOREIGN PATENTS

| Number | Country | Date |
|---|---|---|
| 560,719 | Germany | Oct. 6, 1932 |